(12) United States Patent
Lightbody et al.

(10) Patent No.: US 9,109,099 B2
(45) Date of Patent: Aug. 18, 2015

(54) POLYETHYLENE ADDITIVE

(71) Applicant: NOVA Chemicals (International) S.A., Fribourg (CH)

(72) Inventors: Owen Lightbody, Calgary (CA); Norman Dorien Joseph Aubee, Okotoks (CA); P Scott Chisholm, Calgary (CA); Tony Tikuisis, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 14/576,669

(22) Filed: Dec. 19, 2014

(65) Prior Publication Data

US 2015/0105509 A1  Apr. 16, 2015

Related U.S. Application Data

(62) Division of application No. 14/192,223, filed on Feb. 27, 2014.

(30) Foreign Application Priority Data

Mar. 12, 2013 (CA) ..................................... 2809406

(51) Int. Cl.
*C08K 5/56* (2006.01)
*C08K 5/103* (2006.01)
*C08L 23/06* (2006.01)
*C08L 23/12* (2006.01)

(52) U.S. Cl.
CPC . *C08K 5/56* (2013.01); *C08K 5/103* (2013.01); *C08L 23/12* (2013.01)

(58) Field of Classification Search
None
See application file for complete search history.

(56) References Cited

U.S. PATENT DOCUMENTS

2006/0047078 A1   3/2006  Swabey et al.
2006/0275507 A1*  12/2006  Hartman ..................... 424/642

FOREIGN PATENT DOCUMENTS

CN       103110028 A  *  2/2009

* cited by examiner

*Primary Examiner* — Kara Boyle
(74) *Attorney, Agent, or Firm* — Julie L. Heinrich

(57) ABSTRACT

A new additive for plastics (for example, polyethylene) is prepared by reacting a fatty acid ester of glycerol (such as glycerol monostearate) with a source of a reactive divalent metal selected from zinc, calcium, and magnesium. In an embodiment, Zinc oxide is the reactive divalent metal and the reaction is conducted in the presence of an acid such as zinc acetate. In one embodiment, a molar excess of zinc oxide (compared to the fatty acid ester) is used. The additive is suitable for use in the preparation of injection molded parts, rotomolded parts, and films.

19 Claims, No Drawings

POLYETHYLENE ADDITIVE

CROSS REFERENCE TO RELATED PATENT APPLICATION

This application is a divisional of U.S. application Ser. No. 14/192,223, filed on Feb. 27, 2014, entitled Polyethylene Additive, which is herein incorporated by reference in its entirety.

FIELD OF THE INVENTION

Described herein are novel additives for extruded polyethylene compositions, the polyethylene compositions containing these additives, and plastic products made therefrom.

BACKGROUND

Polyethylene may be classified into two broad families, namely "random" (which is commercially prepared by initiation with free radicals under polymerization conditions that are characterized by the use of very high ethylene pressures) and "linear" (which is commercially prepared with a transition metal catalyst, such as a "Ziegler Natta" catalyst, or a "chromium" catalyst, or a single site catalyst or a "metallocene catalyst").

Most random polyethylene which is commercially sold is a homopolymer of ethylene. This type of polyethylene is also known as "high pressure low density polyethylene" because the random polymer structure produces a lower polymer density. In contrast, most linear polyethylene which is commercially sold is copolymer of ethylene with at least one alpha olefin (such as, butene, hexene or octene). The incorporation of a comonomer into linear polyethylene reduces the density of the resulting copolymer. For example, a linear ethylene homopolymer generally has a very high density (typically greater than 0.955 grams per cubic centimeter (g/cc))—but the incorporation of small amounts of comonomer results in the production of so-called "high density polyethylene" (or "HDPE"—typically, having densities greater than 0.940 g/cc) and the incorporation of further comonomer produces so-called "linear low density polyethylene" (or "LLDPE"—typically having a density of from about 0.905 g/cc to 0.940 g/cc).

Linear polyethylene is converted into finished goods using a variety of molding and extrusion processes. Additives are typically used to improve the conversion process and/or to modify the properties of the finished good.

One widely used family of additives may be described as the mono- and di-esters of glycerol with higher fatty acids. Examples of these additives include glycerol monostearate (also known as glyceryl monostearate and/or "GMS") and glycerol monooleate.

GMS may be used as a (i) mold release agent (including rotational molding); (ii) an anti-static agent (especially for film); or (iii) as a blowing co-agent for the preparation of foams.

GMS is very polar in comparison to the host polyethylene resin. Accordingly, GMS tends to migrate from the resin and form a coating on the surface of the finished polyethylene goods. This is desirable in some respects (as this coating is believed to be responsible for the mold release and anti-static properties) but it is also undesirable because the GMS can also leave a greasy residue on surfaces that come into contact with the molded polyethylene part or film (such as, the mold shell and/or film extrusion equipment).

A need exists for materials and methods to reduce the amount of greasy residue that is transferred to polyethylene conversion equipment when GMS is used as an additive.

SUMMARY

In one embodiment, the present invention provides a polyethylene additive prepared by the reaction of:
 a) a fatty acid ester of glycerol; with
 b) a divalent metal selected from zinc, calcium, and magnesium.

In a second embodiment, a process to prepare a polyethylene additive comprising reacting a fatty acid ester with a divalent metal is provided.

In a third embodiment, the present invention provides a process to prepare a polyethylene additive by the reaction of a fatty acid ester of glycerol with a divalent metal, said process comprising reacting said fatty acid ester with said divalent metal in the presence of an acid catalyst.

In a fourth embodiment, the present invention provides
 a) polyethylene;
 b) from about 100 to about 5000 parts per million by weight of the above described additive.

In a fifth embodiment, a polyethylene composition comprising a high density polyethylene; and from 500 to 5000 parts per million by weight of the additives described herein is provided.

In a fifth embodiment, the present invention provides a polyethylene composition comprising;
 a) a first high density polyethylene having a density of from about 0.95 to about 0.97 g/cc;
 b) a second high density polyethylene having a density of from about 0.955 to about 0.965 g/cc; and
 c) from 500 to 5000 parts per million by weight of the additive of claim 1;
 wherein said first high density polyethylene has an $I_2$ value at least 10 times greater than the $I_2'$ value of said second high density polyethylene, and the $I_2'$ value of said second high density polyethylene is from about 0.1 to about 2 grams/10 minutes.

In a sixth embodiment, the present invention provides a polyethylene film prepared by the blown film extrusion of a blend of HDPE with from about 100 to about 5,000 parts per million by weight, or from about 500 to about 2,000 parts per million by weight of the present additive.

In other embodiments, blown film of compositions described herein have an improvement in WVTR of at least about 20% in comparison to films made in the absence of the additive.

DETAILED DESCRIPTION

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

Additives

The additives described herein may be prepared from a fatty acid ester of glycerol. These esters are commercially available and are typically derived from natural sources. The mono esters are generally referred to by the names glycerol monostearate and glycerol monooleate, although it will be recognized by those skilled in the art that the esters often contain a mixture of fatty acids—i.e., the esters do not contain only stearic acid or oleic acid (as the common name might imply). It will also be recognized that a product sold as a "monostearate" or "monooleate" will typically also contain some di-esters (in fact, it is not uncommon for a "monostearate" to be sold with a specification that allows for the presence of di-esters). Commercially available glycerol monostearate (GMS) and glycerol monooleate are often used for reasons of cost and availability. The GMS used in the Examples was a commercially available product (sold under the trade name ATMER™ 129) and was used as received.

The above described ester is reacted with a source of a reactive divalent metal selected from zinc, calcium, and magnesium. In one embodiment, the reactive divalent metal is an oxide or hydroxide of these metals. In one embodiment zinc is the metal and zinc oxide is the source of zinc.

A catalytic amount of an acid is used to initiate the reaction (with zinc acetate being an example of such an acid).

The reaction may be conducted in a stirred reactor. Elevated temperatures (from about 40 to about 200° C.) assist the reaction.

In one embodiment, the relative amounts of the glycerol ester and metal are from about 1/3 to about 3/1 on a molar basis. In one embodiment, a molar excess of the metal, for example, zinc oxide, is used. Zinc oxide is widely used as a polyethylene additive, so the presence of unreacted zinc oxide should not be problematic for many applications.

High Density Polyethylene (HDPE)

In one embodiment, the polyethylene is a high density polyethylene (HDPE). As used herein, the term high density polyethylene means that the density is greater than about 0.935 grams per cubic centimeter (g/cc) as measured by ASTM D1505.

The compositions described herein are suitable for use in the preparation of molded goods (such as, extruded profiles/pipes or injection molded parts, such as, caps or closures); rotomolded parts and films. In one embodiment, a HDPE having a melt index, $I_2$, of from about 0.2 to about 20 grams per 10 minutes and a density of from about 0.950 to about 0.970 g/cc is used when preparing film. $I_2$ is measured by ASTM D 1238, (when conducted at 190° C., using a 2.16 kg weight). Molded goods may be prepared from a HDPE having a density of from about 0.935 g/cc to about 0.955 g/cc and a melt index of from about 0.2 to about 200 grams per 10 minutes. The use of this additive may reduce the permeability of the molded part and, furthermore, the additive may reduce the molding cycle time. In addition, in some embodiments, the use of the present additive has been found to improve the barrier property of polyethylene film.

In one embodiment, blends of HDPE are used when preparing films having enhanced barrier properties. Example blends are described in more detail below.

Plastic films are widely used as packaging materials for foods. Flexible films, including multilayer films, are used to prepare bags, wrappers, pouches and other thermoformed materials.

The permeability of these plastic films to gases (especially, oxygen) and moisture is one consideration during the design of a suitable food package.

The permeability of linear polyethylene film to moisture is typically described by a "water vapor transmission rate" (or "WVTR"). In certain applications, some vapor transmission is desirable, for example, to allow moisture out of a package which contains produce. The use of linear low density polyethylene (LLDPE) which may be filled with calcium carbonate (to further increase vapor transmission) is common for this purpose.

Conversely, for packages which contain crispy foods such as breakfast cereals or crackers, it is desirable to limit WVTR to very low levels to prevent the food from going stale. The use of HDPE to prepare barrier film is common for this purpose.

The manufacture of barrier food packaging from plastic resins involves two basic operations.

The first operation involves the manufacture of plastic film from the plastic resin. Most barrier films are prepared by blown film extrusion, in which the plastic is melted in an extruder, then forced through an annular die. The extrudate from the annular die is subjected to blown air, thus forming a plastic bubble. The use of multiple extruders and concentric dies permits multilayer structures to be co-extruded by the blown film process. The product from this operation is "barrier film" which is collected on rolls and shipped to the manufacturers of food packaging.

The manufacturer of the food packaging generally converts the rolls of blown film into packaged foods. This typically involves three basic steps:

1) forming the package;
2) filling the package; and
3) sealing the food in the finished package.

Although the specific details will vary from manufacturer to manufacturer, it will be readily appreciated that the film needs to have a balance of physical properties in order to be suitable for food packaging. In addition to low WVTR, it is desirable for the film to seal well and to have sufficient impact strength and stiffness (or film modulus) to allow easy handling of the package. Multilayer coextrusions are often used to achieve this balance of properties, with 3 and 5 layer coextrusions being well known. Sealant layers may be prepared with ethylene-vinyl acetate (EVA) ionomers (such as, those sold under the trademark SURLYN® by E.I. DuPont), very low density polyethylene (polyethylene copolymers having a density of less than about 0.910 grams per cubic centimeter) and blends with small amounts of polybutene. It is known to use sealant compositions in both skin layers of a coextrusion or in only one of the skin layers.

HDPE Blends for Barrier Films

In one embodiment, a blend of two HDPE resins is used for barrier films, as discussed below.

Blend Component a)

Examples of blend component a) comprise a HDPE with a comparatively high melt index. As used herein, the term "melt index" is meant to refer to the value obtained by ASTM D 1238 (when conducted at 190° C., using a 2.16 kg weight). This term is also referenced to herein as "$I_2$" (expressed in grams of polyethylene which flow during the 10 minute testing period, or "gram/10 minutes"). As will be recognized by those skilled in the art, melt index, $I_2$, is in general inversely proportional to molecular weight. Thus, blend component a) has a comparatively high melt index (or, alternatively stated, a comparatively low molecular weight) in comparison to blend component b).

In one embodiment, the absolute value of $I_2$ for blend component a) is greater than about 5 grams/10 minutes, or greater than 10 grams/10 minutes. However, the relative value of $I_2$ for blend component a) compared to component b) is also important and can be at least about 10 times higher than the $I_2$ value for blend component b). The $I_2$ value for blend component b) is referred to herein as $I_2'$. Thus, for the purpose of illustration: if the $I_2'$ value of blend component b) is about 1 gram/10 minutes, then the $I_2$ value of blend component a) should be at least about 10 grams/10 minutes.

Another embodiment of blend component a) is further characterized by:
  i) component a) should have a density of from about 0.95 to about 0.97 g/cc; and
  ii) component a) may be present in an amount of from about 5 to about 60 weight % of the total HDPE composition, with blend component b) forming the balance of the total HDPE composition, or in amounts of from about 10 to about 40 weight %, or from about 20 to about 40 weight % of the total HDPE composition. It is permissible to use more than one high density polyethylene to form blend component a).

The molecular weight distribution (Mw/Mn) is determined by dividing the weight average molecular weight (Mw) by number average molecular weight (Mn) where Mw and Mn are determined by gel permeation chromatography, according to ASTM D 6474-99. In some embodiments, the molecular weight distribution of component a) is from about 2 to about 20, or from about 2 to about 4. While not wishing to be bound by theory, it is believed that a low Mw/Mn value (from about 2 to about 4) for component a) may improve the nucleation rate and overall barrier performance of blown films prepared according to the various processes of this invention.

Blend Component b)

Blend component b) is also a high density polyethylene, which has a density of from about 0.950 to about 0.970 g/cc, or from about 0.955 to about 0.965 g/cc.

The melt index of blend component b) is also determined by ASTM D 1238 at 190° C. using a 2.16 kg load. The melt index value for blend component b) (referred to herein as $I_2'$) is lower than that of blend component a), indicating that blend component b) has a comparatively higher molecular weight. In one embodiment, the absolute value of $I_2'$ is from about 0.1 to about 2 grams/10 minutes.

The molecular weight distribution (Mw/Mn) of component b) is not critical to the success of this invention, though a Mw/Mn of from about 2 to about 4 is exemplary for component b).

As noted above, in one embodiment, the ratio of the melt index of component b) divided by the melt index of component a) is greater than 10/1, or greater than 20/1 or greater than 50/1.

Blend component b) may also contain more than one HDPE resin.

Overall HDPE Blend Composition for Film

The overall high density blend composition is formed by blending together blend component a) with blend component b). In one embodiment, the overall HDPE composition has a melt index (ASTM D 1238, measured at 190° C. with a 2.16 kg load) of from about 0.5 to about 10 grams/10 minutes, or from about 0.8 to about 8 grams/10 minutes. In one embodiment, the density is from about 0.955 to about 0.970 g/cc, or from about 0.960 to about 0.967 g/cc.

The blends may be made by any blending process, such as: 1) physical blending of particulate resin; 2) co-feed of different HDPE resins to a common extruder; 3) melt mixing (in any conventional polymer mixing apparatus); 4) solution blending; or, 5) a polymerization process which employs 2 or more reactors.

In one embodiment, HDPE blend composition is prepared by melt blending the following two blend components in an extruder: from about 10 to about 30 weight % of component a): where component a) is a conventional HDPE resin having a melt index, $I_2$, of from about 15 to about 30 grams/10 minutes and a density of from about 0.950 to about 0.960 g/cc with from about 90 to about 70 weight % of component b): where component b) is a conventional HDPE resin having a melt index, $I_2'$, of from about 0.8 to about 2 grams/10 minutes and a density of from about 0.955 to about 0.965 g/cc.

An example of a commercially available HDPE resin suitable for component a) is sold under the trademark SCLAIR® 79F, which is an HDPE resin that is prepared by the homopolymerization of ethylene with a conventional Ziegler Natta catalyst. It has a typical melt index of 18 grams/10 minutes and a typical density of 0.963 g/cc and a typical molecular weight distribution of about 2.7.

Examples of commercially available HDPE resins which are suitable for blend component b) include (with typical melt index and density values shown in brackets):
  a) SCLAIR® 19G (melt index=1.2 grams/10 minutes, density=0.962 g/cc);
  b) MARFLEX® 9659 (available from Chevron Phillips, melt index=1 grams/10 minutes, density=0.962 g/cc); and
  c) ALATHON® L 5885 (available from Equistar, melt index=0.9 grams/10 minutes, density=0.958 g/cc).

One HDPE blend composition is prepared by a solution polymerization process using two reactors that operate under different polymerization conditions. This provides a uniform, in situ blend of the HDPE blend components. An example of this process is described in published U.S. Patent Application 20060047078 (Swabey et al.). These blends have a density as high as 0.967 g/cc. The overall HDPE blend composition has a MWD (Mw/Mn) of from about 3 to about 20.

Masterbatch

In one embodiment, a "master batch" is prepared by melt mixing one of the additives described herein and a small amount of HDPE. An example master batch would contain about 80 to about 98% by weight of HDPE, with the balance being from about 20 to about 2% of an additive described and claimed herein. The master batch may then be added to the remaining HDPE during the final extrusion process in order to provide the desired amount of additive in the final product.

In one embodiment, the polyethylene compositions comprise from about 100 to about 5000 parts per million by weight of the additives described herein. In other embodiments, the additive is present in from about 500 to about 5000, or from about 500 to about 2000, or from about 2000 to 5000, or from about 1000 to 3000 parts per million by weight of the additive.

Other Additives

The HDPE may also contain other conventional additives, non-limiting examples of conventional additives include: (1) primary antioxidants (such as, hindered phenols, including vitamin E); (2) secondary antioxidants (especially phosphites and phosphonites); and (3) process aids (fluoroelastomer and/or polyethylene glycol bound process aids). In addition, the use of particulate antiblocking agents (such as, silica) is contemplated. The use of silica may help to disperse the additive. One advantage of the additives described herein is the ability of the additives to be readily dispersed in polyethylene without the need for dispersing agents. While not wishing to be bound by theory, it is believed that the alkyl group of the fatty acid helps to disperse the additive.

Film Extrusion Process

Blown Film Process

The extrusion-blown film process is a well-known process for the preparation of plastic film. The process employs an extruder which heats, melts and conveys the molten plastic and forces it through an annular die. Typical extrusion temperatures are from about 330 to about 500° F., or from about 350 to about 460° F.

The polyethylene film is drawn from the die and formed into a tube shape and eventually passed through a pair of draw or nip rollers. Internal compressed air is then introduced from the mandrel causing the tube to increase in diameter forming a bubble of the desired size. Thus, the blown film is stretched in two directions, namely in the axial direction (by the use of forced air which blows out the diameter of the bubble) and in the lengthwise direction of the bubble (by the action of a winding element which pulls the bubble through the machinery). External air is also introduced around the bubble circumference to cool the melt as it exits the die. Film width is varied by introducing more or less internal air into the bubble thus increasing or decreasing the bubble size. Film thickness is controlled primarily by increasing or decreasing the speed of the draw roll or nip roll to control the draw-down rate.

The bubble is then collapsed which forms two layers of film immediately after passing through the draw or nip rolls. The cooled film can then be processed further by cutting and sealing to produce a variety of consumer products. While not wishing to be bound by theory, it is generally believed by those skilled in the art of manufacturing blown films that the physical properties of the finished films are influenced by both the molecular structure of the polyethylene and by the processing conditions. For example, the processing conditions are thought to influence the degree of molecular orientation (in both the machine direction and the axial or cross direction).

A balance of the machine direction ("MD") and transverse direction ("TD"—which is perpendicular to MD) molecular orientations is generally thought to optimize the desirable properties associated with the polymer products described herein (for example, Dart Impact strength, Machine Direction and Transverse Direction tear properties).

Again, while not wishing to be bound by theory, it is generally believed by those skilled in the art of manufacturing blown films that these stretching forces on the bubble may affect the physical properties of the finished film. For example, the "blow up ratio" (i.e., the ratio of the diameter of the blown bubble to the diameter of the annular die) may have a significant effect upon the dart impact strength and tear strength of the finished film.

The above description relates to the preparation of monolayer films. Multilayer films may be prepared by 1) a co-extrusion process that allows more than one stream of molten polymer to be introduced to an annular die resulting in a multi-layered film; or 2) a lamination process in which film layers are laminated together. The films described herein may be prepared using the above described blown film processes.

An alternative process is the so-called "cast film" process, wherein the polyethylene is melted in an extruder, then forced through a linear slit die, thereby casting a thin flat film. The extrusion temperature for cast film is typically somewhat hotter than that used in the blown film process; cast film processes typically operate at temperatures from about 450 to about 550° F. In general, the chill roller used in cast film cools and quenches the film more rapidly than blown film process.

Further Embodiments

In one embodiment, a polyethylene additive is prepared by the reaction of a fatty acid ester of glycerol; with a divalent metal selected from the group consisting of zinc, calcium, and magnesium. In another embodiment, the fatty acid ester of glycerol is glycerol monostearate and the divalent metal is zinc. In another embodiment, the reaction is conducted in the presence of zinc acetate and said zinc is provided in the form of zinc oxide. In another embodiment, the molar ratio of said glycerol monostearate to said zinc oxide is from 1/3 to 3/1.

An additional embodiment includes a process to prepare a polyethylene additive by the reaction of a fatty acid ester with a divalent metal oxide, said process comprising reacting said fatty acid ester with said divalent metal oxide in the presence of an acid catalyst is provided. In another embodiment, the fatty acid ester is glycerol monostearate, the divalent metal oxide is zinc oxide and the catalyst is zinc acetate, with the further proviso that the molar ratio of said glycerol monostearate to said zinc oxide is from 1/3 to 3/1.

In one embodiment, a polyethylene composition comprising a high density polyethylene and from about 500 to about 5000 parts per million by weight of the additives described herein is provided. In another embodiment, the density of the polyethylene is characterized by having a melt index of from about 0.5 to about 10 grams per 10 minutes and a density of from about 0.955 to about 0.970 g/cc.

Further details are provided in the following examples. The following examples are merely illustrative of the invention and are not intended to be limiting. Unless otherwise indicated, all percentages are by weight unless otherwise specified.

EXAMPLES

Example 1

Additive Synthesis

A mixture of zinc oxide (5 g, 0.06 mol), GMS (22 g, 0.06 mol) and a catalytic amount of zinc acetate (0.5 g) were thoroughly mixed in a beaker. The smell of acetic acid was quite noticeable during the reaction. The solids were heated to 150° C. for 2 to 3 hours before the suspension was cooled to room temperature. The white solid was removed from the beaker and ground using a mortar and pestle.

Characterization of the product (i.e., the additives described herein) is not trivial because the product was not highly crystalline and because of limited solubility. FTIR spectra of the starting material (GMS) and the product (additive) showed several differences that confirm a reaction did occur. In particular, the starting GMS shows a broad peak at a wavelength of about 3300 cm$^{-1}$ and this peak is generally regarded as indicating the presence of hydroxyl (—OH) functionality. The FTIR spectrum of the additive shows the loss of most of this peak, indicating that the hydroxyl group participates in the reaction. The FTIR spectrum of the additive also shows a new broad peak at a wavelength of about 1900 cm$^{-1}$, suggesting the presence of a reaction product of ZnO with the hydroxyl group.

Example 2

HDPE barrier film compositions were prepared on a blown film line manufactured by Macro Engineering Company of Mississauga, Ontario, Canada.

The blown film bubble is air cooled. Typical blow up ratio (BUR) for barrier films prepared on this line are from 1.5/1 to 4/1.

The films of this example were prepared using a film thickness aiming point of 1.5 mils.

Water Vapor Transmission Rate ("WVTR", expressed as grams of water vapor transmitted per 100 square inches of film per day at a specified film thickness (mils), or g/100 in$^2$/day) was measured in accordance with ASTM F1249-90 with a MOCON permatron developed by Modern Controls Inc. at conditions of 100° F. (37.8° C.) and 100% relative humidity.

A HDPE blend was used in all experiments. This HDPE blend was prepared in a dual reactor solution polymerization process in accordance with the disclosure of published U.S. Patent Application 20060047078 (Swabey et al.). The HDPE blend had a melt index, $I_2$, of 1.2 grams/10 minutes, a density of 0.967 g/cc and a molecular weight distribution, Mw/Mn, of 8.9. The HDPE blend had two distinct fractions which varied according to molecular weight. The low molecular weight fraction (or component a)) was about 55 weight % of the total composition and had a melt index, $I_2$, which was estimated to be greater than 5000 grams/10 minutes. The high molecular weight fraction was about 45 weight % of the total composition and had a melt index which was estimated to be less than 0.1 grams/10 minutes.

As noted above, melt index ($I_2$) is generally inversely proportional to molecular weight for polyethylene resins. This was confirmed for homopolymer HDPE resins having a narrow molecular weight distribution (of less than 3) by preparing a plot of log ($I_2$) versus log (weight average molecular weight, Mw). In order to prepare this plot, the melt index ($I_2$) and weight average molecular (Mw) of more than 15 different homopolymer HDPE resins were measured. These homopolymer HDPE resins had a narrow molecular weight distribution (less than 3) but had different Mw—ranging from about 30,000 to 150,000. (As will be appreciated by those skilled in the art, it is difficult to obtain reproducible $I_2$ values for polyethylene resins having a molecular weight which is outside of this range).

A log/log plot of these $I_2$ and Mw values was used to calculate the following relation between $I_2$ and Mw for such homopolymer HDPE resins:

$$I_2 = (1.774 \times 10^{-19}) \times (Mw^{-3.86}). \quad \text{a)}$$

Extrapolation (based on the above relation) was used to estimate the $I_2$ values of component a) and component b) of the HDPE blend. That is, the molecular weight of component a) and component b) was measured and the Mw values were used to estimate the $I_2$ values. It will be appreciated by those skilled in the art that it can be difficult to physically blend these HDPE blend components (due to the very different viscosities of the two HDPE blend components a) and b)). Accordingly, solution blending or an in-situ blending (i.e., prepared by a polymerization process) are examples of methods used to prepare such HDPE compositions.

A first comparative film was prepared from the above described HDPE blend. The HDPE blend did contain conventional antioxidants (a hindered phenol and a hindered phosphite) but did not contain an additive of this invention. A film having a thickness of 1.5 mils was prepared (on the "Macro" line); tested (on the "MOCON" instrument) and observed to have a WVTR of 0.18 g/100 in$^2$/day (Ex 1-C in Table 1).

Additional films that contain the inventive additive (from Example 1, above) in the amounts shown in Table 1 were also prepared.

TABLE 1

| Ex | | WVTR (g/100 in$^2$/d) |
|---|---|---|
| 1-C | 0 ppm | 0.18 |
| 2 | 750 ppm | 0.1106 |
| 3 | 1500 ppm | 0.0832 |
| 4 | 2500 ppm | 0.0708 |

As shown in Table 1, WVTR is greatly improved (reduced) with the use of this additive. Optical properties were also improved. Specifically, the film of comparative example 1-C had a measured haze of 77% and a gloss of 6%; in contrast a film prepared with 2000 ppm of the present additive had an improved (lower) haze of 36% and improved (higher) gloss of 20%. Haze was determined according to ASTM D1003 and gloss according to ASTM D1894.

Comparative films were also prepared using 1) GMS as the comparative additive (in an amount of 2000 ppm of GMS); and 2) GMS and ZnO as the comparative additives (in amounts of about 4000 ppm and about 1000 ppm, respectively).

The comparative film prepared using the GMS had a surface layer of a greasy residue. This residue could be easily removed by rubbing the surface of the film. The comparative film prepared with the GMS and ZnO was tested for WVTR. The WVTR of this comparative film was not improved.

The present invention has been described with reference to certain details of particular embodiments thereof. It is not intended that such details be regarded as limitations upon the scope of the invention except insofar as and to the extent that they are included in the accompanying claims.

What is claimed is:

1. A polyethylene composition comprising a polyethylene polymer or copolymer and an additive prepared by the reaction of
   a) a fatty acid ester of glycerol; with
   b) a divalent metal selected from zinc, calcium, and magnesium.

2. The polyethylene composition of claim 1 wherein the molar ratio of said fatty acid ester of glycerol to said divalent metal is from about 1/3 to about 3/1.

3. The polyethylene composition of claim 1 wherein said fatty acid ester of glycerol is glycerol monostearate or glycerol monooleate.

4. The polyethylene composition of claim 1 wherein said fatty acid ester of glycerol is glycerol monostearate.

5. The polyethylene composition of claim 1 wherein said divalent metal is zinc or magnesium.

6. The polyethylene composition of claim 1 wherein said divalent metal is zinc.

7. The polyethylene composition of claim 1 wherein said divalent metal is provided in the form of an oxide or hydroxide.

8. The polyethylene composition of claim 1 wherein said divalent metal is provided in the form of an oxide.

9. The polyethylene composition of claim 1 wherein said reaction is conducted in the presence of an acid catalyst.

10. The polyethylene composition of claim 1 wherein said reaction is conducted in the presence of zinc acetate and said divalent metal is provided in the form of zinc oxide.

11. The polyethylene composition of claim 1 wherein said reaction is conducted in the presence of magnesium acetate and said divalent metal is provided in the form of magnesium hydroxide.

12. A process to prepare a polyethylene composition comprising a polyethylene polymer or copolymer and an additive comprising
   a) reacting a fatty acid ester with a divalent metal;
   b) isolating the product from the reaction of step a);
   c) adding the isolated product of step b) to a polyethylene polymer or copolymer.

13. The process of claim 12 wherein said reaction of a fatty acid ester with a divalent metal occurs in the presence of an acid catalyst.

14. The process of claim 13 wherein said fatty acid ester is glycerol monostearate, said divalent metal is zinc oxide and said acid catalyst is zinc acetate, wherein the molar ratio of said glycerol monostearate to said zinc oxide is from about 1/3 to about 3/1.

15. The process of claim 13 wherein said fatty acid ester is glycerol monooleate, said divalent metal is magnesium hydroxide and said acid catalyst is magnesium acetate, wherein the molar ratio of said glycerol monooleate to said magnesium hydroxide is from about 1/3 to about 3/1.

16. A polyethylene composition comprising
   a) high density polyethylene; and
   b) from about 500 to about 5000 parts per million by weight of an additive prepared by the reaction of
      i) a fatty acid ester of glycerol; with
      ii) a divalent metal selected from zinc, calcium, and magnesium.

17. The polyethylene composition of claim 16 wherein said high density polyethylene has a melt index of from about 0.5 to about 10 grams per 10 minutes and a density of from about 0.955 to about 0.970 g/cc; wherein melt index is determined by ASTM D-1238 at 190° C. and density is determined by ASTM D-1505.

18. The polyethylene composition of claim 16 where the high density polyethylene comprises
   a) a first high density polyethylene having a density of from about 0.95 to about 0.97 g/cc;
   b) a second high density polyethylene having a density of from about 0.955 to about 0.965 g/cc;
wherein said first high density polyethylene has an $I_2$ value at least 10 times greater than the $I_2'$ value of said second high density polyethylene, and the $I_2'$ value of said second high density polyethylene is from about 0.1 to about 2 grams/10 minutes; wherein melt index is determined by ASTM D-1238 at 190° C. and density is determined by ASTM D-1505.

19. A blown film prepared from the composition of claim 16, characterized in that said blown film has at least about 20% improvement in WVTR compared to a film made without said additive.

\* \* \* \* \*